(No Model.) 2 Sheets—Sheet 1.
F. SHUMAN.
PROCESS OF MANUFACTURING WIRE GLASS.
No. 510,822. Patented Dec. 12, 1893.
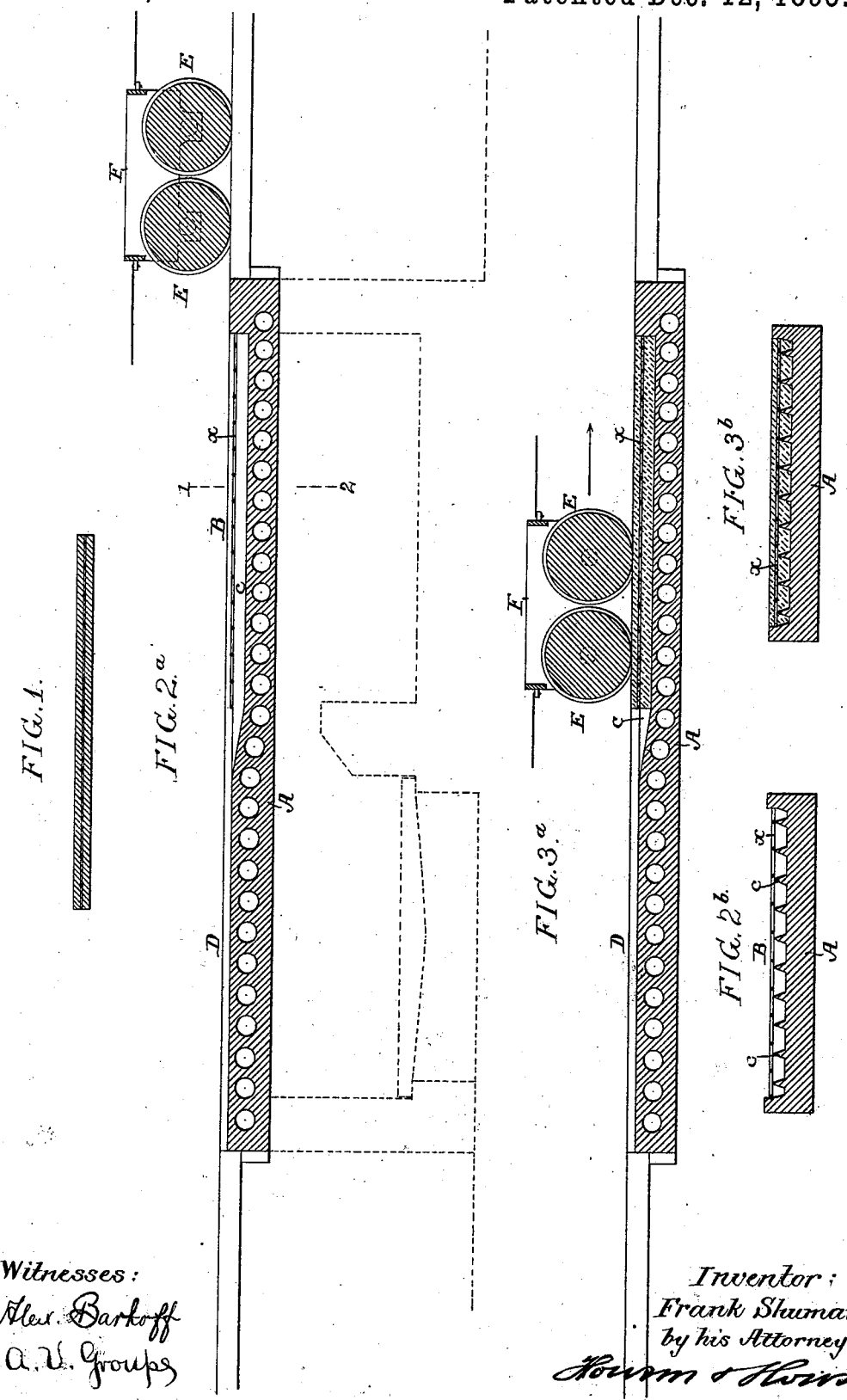
Witnesses:
Alex. Barkoff
A. V. Groups
Inventor:
Frank Shuman
by his Attorneys

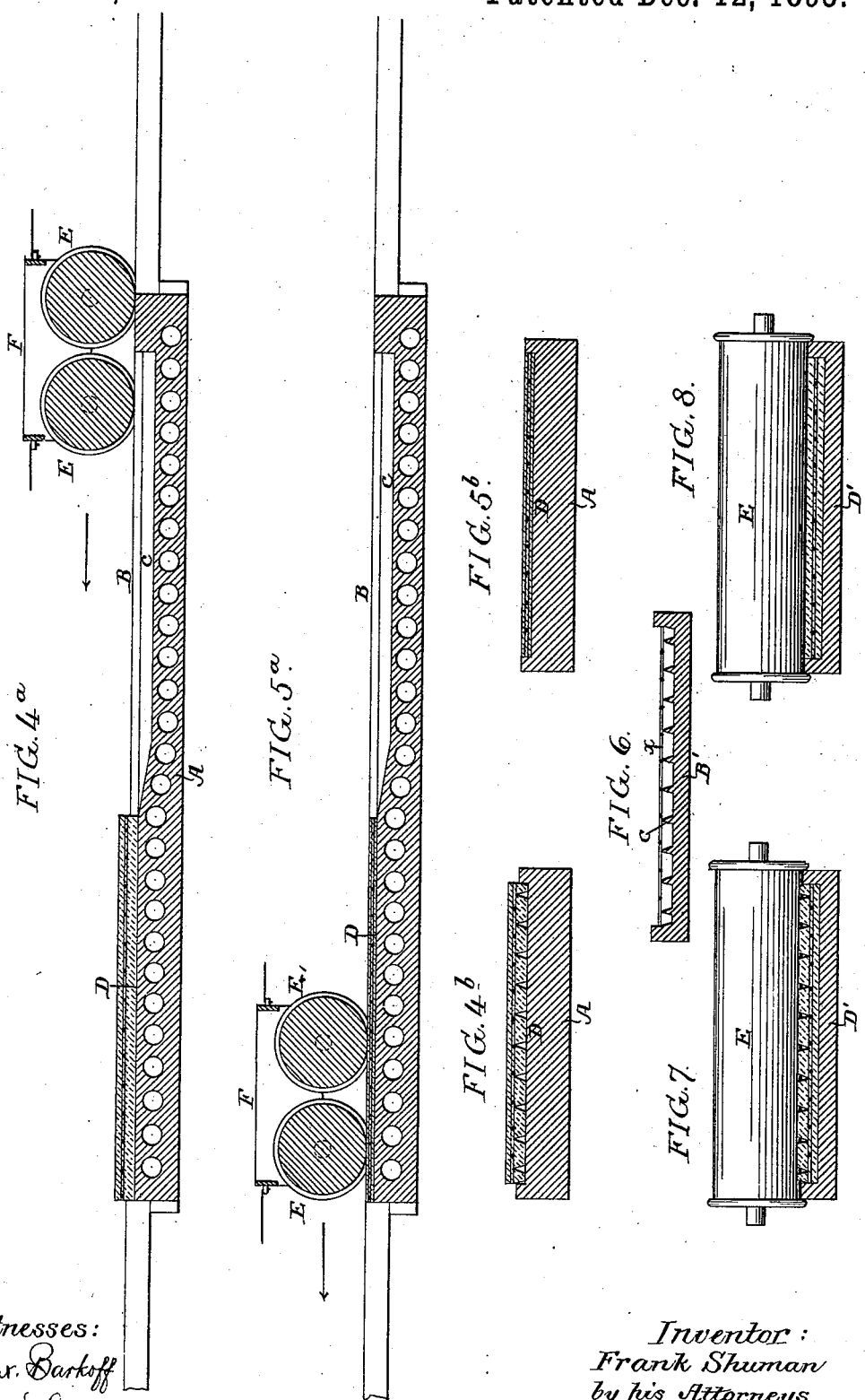

UNITED STATES PATENT OFFICE.

FRANK SHUMAN, OF PHILADELPHIA, PENNSYLVANIA.

PROCESS OF MANUFACTURING WIRE-GLASS.

SPECIFICATION forming part of Letters Patent No. 510,822, dated December 12, 1893.

Application filed December 29, 1892. Serial No. 456,674. (No specimens.)

*To all whom it may concern:*

Be it known that I, FRANK SHUMAN, a citizen of the United States, and a resident of Philadelphia, Pennsylvania, have invented an Improved Process of Manufacturing Wire-Glass, of which the following is a specification.

The object of my invention is to embed wire in glass, so as to not only give strength to the glass, but also to protect the wire from the action of the atmosphere. This glass is commonly called wire glass.

In the accompanying drawings:—Figure 1, is a sectional view of a sheet of glass made in accordance with my invention. Fig. $2^a$, is a longitudinal sectional view of a bed of a machine which is adapted to carry out my process, showing the wire mounted thereon. Fig. $2^b$, is a transverse sectional view on the line 1—2, Fig. $2^a$. Figs. $3^a$, $4^a$, and $5^a$, are longitudinal sectional views illustrating the different steps in the process. Figs. $3^b$, $4^b$, and $5^b$, are transverse sectional views illustrating different steps in the process; and Figs. 6, 7, and 8, are diagram views illustrating another method of carrying out my process.

Referring to Figs. $2^a$ and $2^b$, A is a table suitably heated, either by a furnace or by pipes or passages for hot air or gas in the table itself. The upper surface of this table has a ribbed portion B and a flat portion D. The ribs $c$ of the ribbed portion extend in the present instance, lengthwise of the table, and these ribs are preferably V-shaped in cross section as shown in Fig. $2^b$, and extend to a fine edge, but it will be understood that the ribs may be shaped differently without departing from my invention. The upper edge of each rib is preferably on a line with the flat surface B, and the channels between the ribs gradually merge into the flat surface as shown in Fig. $2^a$, so that the glass after being formed on the ribbed portion B, can be readily drawn up upon the flat portion D for final action. The wire $x$ to be embedded in the glass is placed on the ribbed portion as shown in Figs. $2^a$ and $2^b$, so that the glass can pass through the meshes of the wire when wire gauze is used, or between the wire when wire rods are used. The glass is then poured onto the wire and is rolled down to a level by the rolls E, E, mounted in a suitable carriage F, which can be moved across the table A, either by hand or power.

While I have shown two rolls in order to balance the carriage, it will be understood that one roll will answer the purpose. The idea is to force the glass into the grooves formed by the ribs $c$, and also compact the glass around the wire. After this first step in the process, the glass is drawn from the grooved portion of the table B to the flat portion D as shown in Figs. $4^a$ and $4^b$, the ribs formed on the under side of the glass resting upon the table. The wire is now partially embedded in the glass, and the ribs are formed on one side of the glass. In order to completely close the wire, the ribs are forced down in the present instance by passing the roller E over the glass when on the flat portion D of the table, obliterating the ribs, and forming a smooth surface on both sides of the glass; thus the wire is completely embedded in the glass. In order to place the wire in a central position in the glass, the ribbed portion of the glass is much thicker than the plain portion on the opposite side of the wire. Consequently when the ribs are depressed, they fill out the space between the ribs and the thickness of glass on each side of the wire is about equal.

By the method described above the glass is not turned over, which, in making large sheets of glass, is a delicate operation.

In Figs. 6, 7, and 8, I have shown an apparatus which can be used to carry out my process, dispensing with the table A, and using one table ribbed as shown at B′, Fig. 6. The wire $x$ is placed upon the table as shown, and the glass is poured onto and through the wire. A roller is then passed over the glass to level the glass and force it into the ribs, after which the glass with the wire in it, is turned over onto a smooth bed D′, Fig. 7, and rollers passed over it as shown in Fig. 8, smoothing out the ribs and completely inclosing the wires. A bed having a number of projections may be used to support the wire instead of the ribs, without departing from my invention.

I do not in this application broadly claim the process of manufacturing wire glass by providing a bed with ribs, mounting the wire thereon and pouring the glass onto the wire and through the meshes thereof as this forms the subject of a separate application filed October 20, 1893, Serial No. 488,675.

I claim as my invention—

1. The process herein described of manufacturing wire glass, said process consisting in first pouring the glass onto and through the wires, spreading out the glass, and then pressing the portion of the glass that extends through meshes of the wire so as to cover the wire and embed it within the glass, substantially as described.

2. The process herein described of manufacturing wire glass, said process consisting in first arranging the wire or wire gauze, pouring the glass onto and through the meshes of the wire, forming ribs on the under side of the glass beyond the wire, and finally obliterating the ribs by pressure, the glass forming the ribs spreading over the space between the ribs and embedding the wire in the glass, substantially as described.

3. The process herein described of manufacturing wire glass, said process consisting in arranging the wire or wire gauze, pouring glass upon and through the wire or wire gauze, pressing the glass so as to form projections beyond the wire of a height greater than the thickness of the glass on the upper surface of the wire, and finally placing pressure upon the ribs so as to form a smooth surface on that side of the glass, the glass on each side of the wire being about equal, substantially as described.

In testimony whereof I have signed my name to this specification in the presence of two subscribing witnesses.

FRANK SHUMAN.

Witnesses:
HENRY HOWSON,
JOSEPH H. KLEIN.